July 18, 1967 W. J. CHANCELLOR 3,331,155
PLANTING STRUCTURE AND METHOD OF PLANTING SEEDS
Filed Oct. 22, 1964
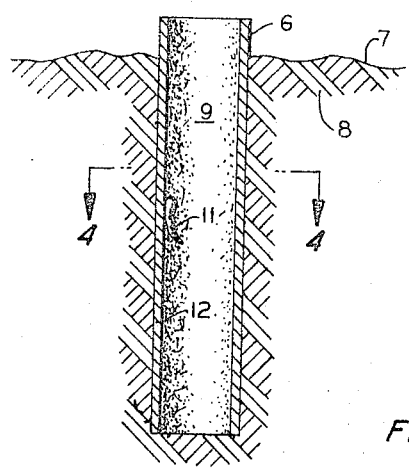
FIG_1
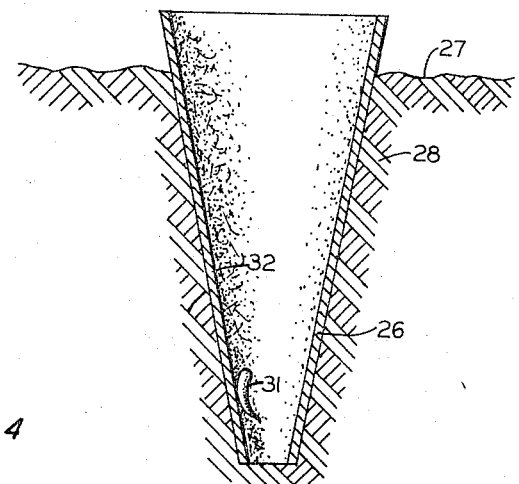
FIG_2
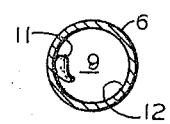
FIG_4
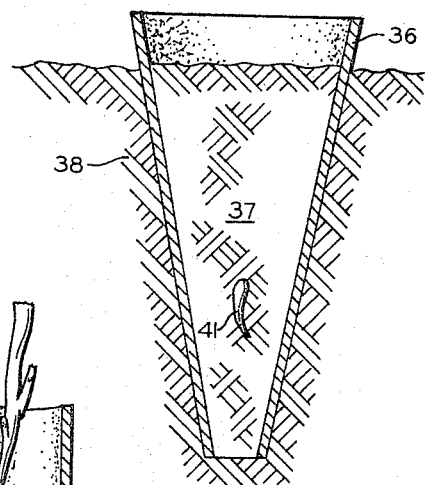
FIG_3
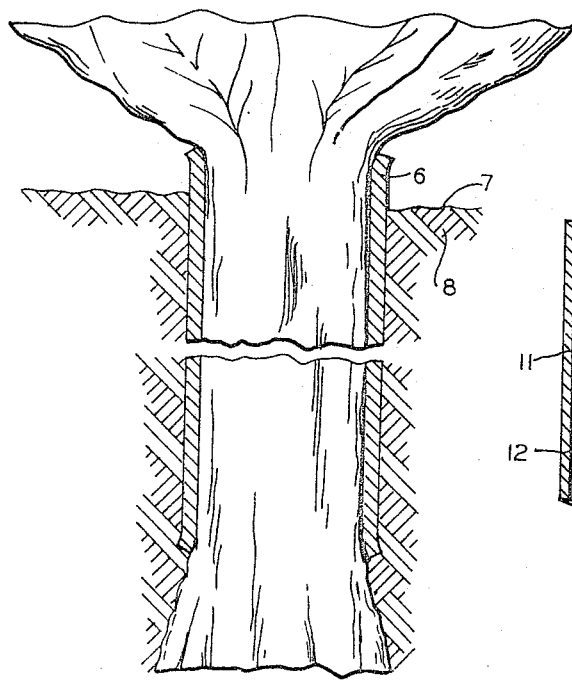
FIG_6
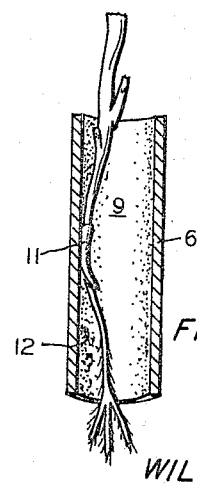
FIG_5
INVENTOR.
WILLIAM J. CHANCELLOR
BY Lothrop & West
ATTORNEYS

United States Patent Office 3,331,155
Patented July 18, 1967

3,331,155
PLANTING STRUCTURE AND METHOD OF PLANTING SEEDS
William J. Chancellor, Davis, Calif., assignor to The Regents of the University of California, Berkeley, Calif.
Filed Oct. 22, 1964, Ser. No. 405,760
1 Claim. (Cl. 47—37)

In many agricultural environments, particularly in the growth of lettuce, for example, it is now customary to sow lettuce seed in a field in spaced rows. The amount of seed planted is considerably in excess of the number of plants that are ultimately required or advantageous. Seed germination and seedling emergence are by no means certain, so excess seeds are planted to make sure that a sufficient number do germinate to provide at least the requisite number of resulting plants. This usually results in many more than the requisite number of plants coming up. It is then necessary to go over the fields when the plants are small and to thin them or to remove some of them in order that the remaining ones may develop into full size lettuce heads properly situated and without crowding. It appears that one of the reasons for the failure of some of the seedlings, otherwise viable, to emerge is that a crust often forms on the surface of the soil. This may be due to the nature of the soil or may be due to lack of rainfall or low moisture content. In any case, it inhibits the seedlings, although germinated, from breaking through the soil crust and from growing.

It is therefore an object of the invention to provide a planting structure for seeds to insure or encourage the germination and emergence as plants of most all of the seeds that are planted. It then becomes feasible to plant a field with only the desired number of seeds corresponding to the desired number of plants. If the seeds are planted in the desired, spaced locations, any subsequent thinning or cutting out operation is eliminated.

Another object of the invention is to provide a planting structure and a method of planting seeds which avoids adverse effects of a surface crust on the soil; that is, the presence of a crust on the planting ground is entirely avoided or is rendered harmless.

Another object of the invention is to provide a planting structure the use of which will reduce the over-all cost of seeding a given area of land and will foster the growth of the requisite number of plants thereon.

Another object of the invention is to provide a planting structure and method of planting effective to improve the germination of the seed and the growth of young plants therefrom.

Another object of the invention is to provide a planting structure which is an improvement over those heretofore known.

Another object of the invention is to provide a method of planting seeds which puts the seed in an improved environment for germination and initial growth.

A still further object of the invention is in general to improve the culture of seeds in planting ground.

Other objects together with the foregoing are attained in the embodiments of the invention described in the accompanying description and illustrated in the accompanying drawings, in which:

FIGURE 1 is a cross section on a vertical plane through a planting structure pursuant to the invention, the planting structure being in position in the planting ground;

FIGURE 2 is a cross section on a vertical plane through a planting structure of variant form also shown in position in the planting ground;

FIGURE 3 is a cross section on a vertical plane through a planting structure substantially as shown in FIGURE 2 but utilized differently;

FIGURE 4 is a cross section on the plane indicated by the line 4—4 of FIGURE 1;

FIGURE 5 is a cross section through a portion of a planting structure as shown in FIGURE 1 with a partially cultured plant therein; and FIGURE 6 is a cross section through the planting structure of FIGURE 1 at a subsequent stage of plant growth.

While the planting structure and the method of planting seeds pursuant to the invention are applicable to a wide variety of seeds and plants, they have been most extensively tested and have been found quite satisfactory in connection with the growth of head lettuce, and hence are described in that environment as an example herein.

In one form, particularly as shown in FIGURES 1, 4, 5 and 6, the planting structure is a circular cylindrical device or structure 6 open on both ends. The structure 6 has a height or length sufficient to extend well above the surface 7 of the planting ground 8 and likewise to extend below the normal planting depth of the seed. The material of the structure 6 is one affected by water and pervious to ground moisture. The material is sufficiently stiff when dry so that the structure 6 can be thrust vertically into the planting ground 8 without buckling. At the same time, the cross sectional area of the structure is relatively small so that only a moderate force is required to introduce the structure vertically even into rather unfavorable planting ground.

As a suitable material for the structure 6, I have utilized ordinary paper of a coarse, fibrous character rolled upon itself one or more times and held by adhesive to result in a tube. The paper retains its rigidity and integrity for some time after entering the ground, although a substantial amount of moisture is passed from the planting ground 8 through the paper to the interior 9 of the structure. Eventually the paper fails in strength and disintegrates and the adhesive may also fail after wetting, so that the structure no longer retains any definable shape and is easily displaced mechanically. This is particularly true in the lower portion, which normally is wetter. The upper portion above the surface of the ground 7, usually remaining dryer, sometimes retains its stiff nature for a longer period than the lower portion.

Pursuant to the invention, there is provided in the planting structure 6 a single seed 11 of the plant to be established, in this instance a lettuce plant. More than one seed can be provided in each structure, but in the usual case one seed only is preferred. The seed 11 is shown approximately to scale in FIGURE 1 and has a diameter much less than the diameter of the space 9 within the structure 6 so that the seed 11 is exposed very freely to the immediately surrounding atmosphere.

In order to hold the seed 11 in position, it is secured to the inside wall 12 of the structure 6 with adhesive. With some glues, the seed can be entirely covered without harm. Only a little adhesive is used, preferably, so that a large portion of the seed surface remains exposed. In some instances the adhesive is water soluble, but it need not be. A poly-vinyl acetate glue becomes gummy when wet and serves well, although technically it is not water soluble. The seed 11 is preferably disposed in the structure 6 so as to be, when planted, at about its normal planting depth. Conveniently, the structure 6 is a little more than twice the length of the planting depth. It is then immaterial whether the symmetrical structure is planted one end up or the other end up. Stated differently, the seed 11 is affixed to one side wall of the structure 6 about midway between the ends thereof.

In carrying out the method, a hole is made in the planting ground 8 by forcing the structure 6 downwardly into the ground in a vertical direction until but a small portion of the structure remains above the ground surface 7. The diameter of the structure 6 is only a few times the diameter of the lettuce seed, and that means that the lower opening of the structure is so small that very little if any soil or planting ground is able to move up into the inside of the structure 6. For all practical purposes, the structure 6 remains free and empty on its interior except for the seed 11.

When the structure is in the ground, moisture passes from the ground through the permeable wall of the structure and becomes available to the seed 11. The metabolism of the seed requires a supply of oxygen. This is readily available from the atmosphere through the open tube structure 6. In using the oxygen, the seed evolves carbon dioxide. This can freely leave the seed through the interior of the structure 6. The tube provides for immediate release of carbon dioxide from the seed and an immediate supply of oxygen to the seed. Thus the seed is held in a satisfactory relationship with the environment.

When the seed germinates and sends out processes, if it happens to have been upright when the structure 6 was planted, the seed grows in the normal fashion, substantially as shown in FIGURE 5. If the seed happened to be planted upside down because of the inversion of the structure 6, then the seed effects a structural reversal within its halves and there is no difficulty, provided only the structure 6 allows room for this turning growth. If there is not sufficient mechanical space for the turning growth, the seedling does not survive.

Experiments indicate that unless the diameter of the structure 6 is several times that of the seed, there is not sufficient room for the seed processes to develop, move and orient themselves, and the seed dies. It has been found that pressure upon the seed directly from surrounding soil in the usual manner of planting may slow or stop seedling growth. If the structure 6 is of a relatively small diameter not much greater than that of the initial seed and is so small as to impose a restriction on the developing seedling's orientation of its self, the plant will die. It has been found that a seed in a structure as shown herein will germinate in the minimum time, depending upon temperature and moisture supply. When the seed is planted directly in the ordinary growing ground and in the ordinary way, the seed may also grow in the minimum time, but may also take as much as three times longer to emerge from the soil if the soil becomes unusually hard or impervious to gases. Hardness and imperviousness can occur without crust formation, but in some extensive growing areas crust formation is one of the main causes of soil hardness and imperviousness. Thus the present structure afford improved circumstances for seed germination under conditions most likely to occur in ordinary planting soils and particularly avoids difficulties due to soil crusts.

As the seed 11 develops, the root processes extend downwardly and eventualy engage directly into the planting ground 8 and also extend outwardly from the bottom of the original structure 6. By this time, much of the lower portion of the structure has long been subjected to moisture and is in the process of disintegrating. The root processes have little difficulty in growing and spreading.

During this time another factor assists in the establishment of the plant. The moisture in the planting ground 8 contains various salts. When that moisture evaporates at the ground surface, the salts are precipitated and left in the soil and so increase the salt concentration in the soil surface region. The emerging plant comes into contact with the concentrated salts and may be killed or injured by them. Since the material of the structure 6 is water permeable, the soluble soil salts also precipitate in the structure 6. But in this location they do not contact the seedlings, which, at least initialy, are spaced from the tube 6. The growing sedling is thus physically separated from contact with excesive salt concentrations, and this condition is no longer an inhibitor. The precipitated salts tend to gather in the upper end of the structure 6 and can be observed visually as a ring of discoloration. Eventually when the structure disintegrates fully and the plant has grown much larger, the salts are not detrimenal and may then be available for beneficial use.

The structure of FIGURE 1 can be easily and quickly introduced into the soil or into the planting ground on a large scale and automatically or mechanically since it is not necessary to orient the symmetrical structure 6. Either end can be uppermost and the seed can grow in either direction. In some cases, orientation of the seed and the planting structure is possible within economical limits. Under those circumstances, I have employed a structure 26 as shown in FIGURE 2. This likewise is inserted into the planting ground 28, as before, with a portion of the structure 26 above the surface 27 of the soil.

The structure 26 is conical, open at both ends, and is comprised of a paper-like material that is water permeable but is sufficiently stiff so that it can be introduced into the ground. The conical shape permits the wall of the structure 26 to be somewhat thinner than otherwise might be the case since the cone is relatively stiff in penetrating the soil. In this instance, the seed 31 is preferably placed on the side wall 32 of the structure 26 and in a position close to the bottom. The root processes of the seed when it germinates will reach the soil somewhat sooner than they do in the FIGURE 1 situation. The conical shape of the structure of FIGURE 2 allows somewhat freer circulation of atmosphere within the structure so that the interchange of carbon dioxide and oxygen can take place readily.

In FIGURE 3 is disclosed a variant use of the structure of FIGURE 2. The process here is somewhat different in that the structure 36, although very much like that of FIGURE 2 and made of the same material, is partially filled with special, non-crusting planting soil 37 within which a seed 41 is positioned in the customary way. The structure 36 is then placed in a storage rack and moistened until the plant begins to grow. Then, only those structures 36 containing growing plants are inserted into the planting ground 38 in appropriate locations. This structure is primarily useful when only those seeds that have germinated in one location are to be transplanted to a growing location. In controlled experiments, only about sixty percent of the seeds in the FIGURE 3 environment germinated, in distinction to about ninety percent of the seeds in the FIGURES 1 and 2 arrangements without interior soil. The reason for this is not yet fully known, but when the FIGURE 3 device is employed, the germinated ones of the seed holders can be arranged in proper geometrical array in the growing field to simulate one hundred percent germination while avoiding thinning because of overplanting.

Except in the case wherein transplanting the seed may be preferred for other reasons, the structures of the other figures are productive of markedly improved results although the FIGURE 3 structure retains the advantage of eliminating any soil top crust that the growing plant must break through.

What is claimed is:

A planting structure for a seed comprising a circular-cylindrical porous paper tube having a continuous wall defining a straight passage open at both ends of said tube and extending from end to end of said tube, said tube when dry being stiff enough to withstand endwise forcing movement into the ground, said central passage being small enough to preclude the entry of earth into said passage during said forcing movement, a seed disposed within and occupying only part of the cross-sectional area of said passage, and means for adhesively securing said seed to the interior wall of said tube at a point on one side of said passage about midway between the ends of said tube.

References Cited

UNITED STATES PATENTS

| | | | |
|---|---|---|---|
| 1,200,396 | 10/1916 | Southard | 47—37 |
| 1,880,136 | 9/1932 | Hickok | 47—37 |
| 1,959,139 | 5/1934 | Otwell | 47—37 |
| 2,571,491 | 10/1951 | Schindler. | |
| 3,177,616 | 4/1965 | Sawyer | 47—1.2 |

FOREIGN PATENTS 927,029    5/1963    Great Britain.

ABRAHAM G. STONE, *Primary Examiner.*

ANTONIO F. GUIDA, J. R. OAKS, *Assistant Examiners.*